US008795911B2

(12) United States Patent
Taniguchi et al.

(10) Patent No.: US 8,795,911 B2
(45) Date of Patent: Aug. 5, 2014

(54) FUEL CELL MODULE WITH A WATER RESERVOIR INCLUDING A WATER STORING PORTION EXPANDING FROM A CELL UNIT TO AN ANODE SIDE

(75) Inventors: Shunsuke Taniguchi, Kyoto (JP); Takahiro Isono, Kobe (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 982 days.

(21) Appl. No.: 12/076,376

(22) Filed: Mar. 18, 2008

(65) Prior Publication Data

US 2009/0035639 A1  Feb. 5, 2009

(30) Foreign Application Priority Data

Mar. 28, 2007  (JP) ................. 2007-084890

(51) Int. Cl.
*H01M 8/02* (2006.01)
*H01M 8/04* (2006.01)
*H01M 8/10* (2006.01)

(52) U.S. Cl.
USPC ........... 429/414; 429/408; 429/413; 429/492; 429/512

(58) Field of Classification Search
USPC .................. 429/413, 442, 408, 414, 492, 512
See application file for complete search history.

(56) References Cited

U.S. PATENT DOCUMENTS

| 2005/0019639 A1* | 1/2005 | Nakakubo et al. ............... 429/34 |
| 2005/0034987 A1* | 2/2005 | Zhou et al. .................... 204/426 |

FOREIGN PATENT DOCUMENTS

| JP | 6-231793 A | 8/1994 |
| JP | 2002-015763 A | 1/2002 |
| JP | 2006-049097 | 2/2006 |
| JP | 2006-085932 A | 3/2006 |
| JP | 2006-179470 | 7/2006 |
| WO | WO 03/058741 A1 | 7/2003 |
| WO | WO-2006/101132 A1 | 9/2006 |

OTHER PUBLICATIONS

"Fuel Cell Systems Explained", (Ohmsha, Ltd., 2004), 1st ed., p. 183.
Japanese Office Action with English Translation issued in Japanese Application No. 2007-084890 mailed Oct. 30, 2012.

* cited by examiner

*Primary Examiner* — Sean P Cullen
(74) *Attorney, Agent, or Firm* — McDermott Will & Emery LLP (57) ABSTRACT

A fuel cell module includes a cell unit including an electrolyte membrane, a cathode disposed on one face of the electrolyte membrane, and an anode disposed on the other face of the electrolyte membrane, and a water reservoir which stores water produced at the cathode. The water reservoir includes an opening formed in a region other than the cathode of the cell unit, and a projection projecting from the opening to an anode side. The water covering a cathode surface of a fuel cell is reduced.

10 Claims, 11 Drawing Sheets

FUEL CELL MODULE WITH A WATER RESERVOIR INCLUDING A WATER STORING PORTION EXPANDING FROM A CELL UNIT TO AN ANODE SIDE

CROSS-REFERENCE TO RELATED APPLICATIONS

This application is based upon and claims the benefit of priority from the prior Japanese Patent Application No. 2007-084890, filed on Mar. 28, 2007, the entire contents of which are incorporated herein by reference.

BACKGROUND OF THE INVENTION

1. Field of the Invention

The present invention relates to a fuel cell module.

2. Description of the Related Art

Recently much attention has been focused on fuel cells that feature not only high energy conversion efficiency but also no hazardous substance produced by the electricity-generating reaction. Known as one of such fuel cells is the polymer electrolyte fuel cell (PEFC) which operates at temperatures below 100° C. As known types of the polymer electrolyte fuel cell (PEFC), there are, for instance, one using hydrogen as the fuel and another, called direct methanol fuel cell (DMFC), in which methanol water solution as the fuel is not reformed but is directly supplied to the anode so that electricity is produced by an electrochemical reaction induced between the methanol water solution and oxygen.

Of the PEFCs as mentioned above, the passive-type PEFCs and DMFCs which supply air as the oxidant to the cathode by natural diffusion have had a problem of their own. That is, when water produced at the cathode (air electrode) is excessive, the water covering the cathode may interfere with an adequate supply of the oxidant, such as air, to the cathode, thus leading to an output decline.

Therefore, it has been desired that methods be devised by which the water thus produced be removed efficiently without allowing it to cover the cathode. One example of conventionally known methods is a fuel cell equipped with a water retention means having water-absorbing property which is disposed in contact with an oxidant electrode and ion conductor. Another known example is a fuel cell in which water collected in pores formed in a cathode-side gas diffusion layer is led outside by a water-conducting member disposed in such a manner as to enter the pores.

However, such conventional fuel cells require extra space in the entirety of a fuel cell because it is necessary to have a water retention or water storage unit in the lateral or external part thereof. Furthermore, the conventional water-conducting member, which is provided in such a manner as to cover the whole cathode, can cause a drop in output by obstructing the diffusion of air to the cathode electrode.

SUMMARY OF THE INVENTION

The present invention has been made in view of the foregoing circumstances, and a general purpose thereof is to provide a technology for reducing water that covers the cathode in a fuel cell.

In order to solve the foregoing problems, a fuel cell module according to one embodiment of the present invention comprises: a cell unit including an electrolyte membrane, a cathode disposed on one face of the electrolyte membrane, and an anode disposed on the other face thereof; and a water reservoir which stores water produced at the cathode. The water reservoir includes an opening formed in a region other than the cathode of the cell unit and a protruding part projecting from the opening to an anode side.

According to this embodiment, the water produced at the cathode can be collected in the water reservoir provided in a region other than the cathode, so that the water can be removed from the surface of the cathode. This makes it hard for the cathode to be covered by the water it has produced, and there is thus little impediment to the supply of the oxidant, such as air, to the cathode. As a result, the fuel cell module can achieve a stable output over a long period of time.

A plurality of cell units may be arranged substantially in a plane, and the openings of the water reservoirs may be formed between the cathodes of the cell units. In the case of a fuel cell module capable of providing a large electromotive force by a plurality of cell units arranged with space between each other and connected in series by wiring, for instance, the openings of water reservoirs provided in the spaces between the cathodes of the cell units allow efficient collection of water produced at the cathodes while restricting the size of the fuel cell module as a whole.

Another embodiment of the present invention relates also to a fuel cell module. This fuel cell module comprises: a cell unit including an electrolyte membrane, a cathode disposed on one face of the electrolyte membrane, and an anode disposed on the other face thereof; and a water reservoir which stores water produced at the cathode. The water reservoir includes an opening formed in the cathode of the cell unit and a protruding part projecting from the opening to an anode side.

According to this embodiment, the water produced at the cathode can be collected in the water reservoir provided on the cathode, so that the water can be removed efficiently from the surface of the cathode. This makes it hard for the cathode to be covered by the water it has produced, and there is thus little impediment to the supply of the oxidant, such as air, to the cathode. As a result, the fuel cell module can achieve a stable output over a long period of time. Also, a plurality of cell units may be arranged substantially in a plane.

The fuel cell module may further include a fuel chamber, disposed on the anode side of the cell unit, which stores fuel to be supplied to the anode. In such a case, the protruding part projecting to the anode side will be located inside the fuel chamber, but because the fuel, such as hydrogen, in the fuel chamber has a higher diffusivity than air, the protruding part has less effect on the supply of the fuel to the anode than where the water reservoir is so provided as to project to a cathode side. As a result, the fuel cell module can achieve a stable output over a long period of time.

The water reservoir may include a water-absorbing member that absorbs water inside the protruding part. Such an arrangement can prevent the water once collected in the water reservoir from flowing back to the cathode. Also, the water-absorbing member can have the water evaporate gradually, thereby discharging it outside the fuel cell module without allowing it to condensate on the cathode surface.

The water-absorbing member may be so constructed that at least one part thereof is detachable from the water reservoir. Such an arrangement permits replacement of the water-absorbing member or reinstallation thereof after removal of water absorbed therein when water produced has exceeded the ability of the water-absorbing member to retain the water as a result of a certain condition or time of power generation by the fuel cell module. In this manner, water produced may be stored afresh, thus contributing to a longer service of the fuel cell module.

The protruding part may be formed by a part of the abovementioned electrolyte membrane projecting to the anode side. Such a construction allows the water reservoir to protrude to the anode side without making a hole in the electrolyte membrane. And this simple structure helps maintain the airtightness of a cell unit, particularly that on the anode side thereof better than where the water reservoir is so provided as to penetrate the electrolyte membrane. Here, the electrolyte membrane having a protrusion projecting to the anode side may be made by a casting method, for instance.

A cathode-side surface of the cell unit may be so constructed as to be a flat surface without any protrusion that hinders the diffusion of air. Such an arrangement assures a uniform supply of air to the cathode, thereby ensuring a stable output of the fuel cell module.

Fuel used for the anode may be a liquid fuel which at least contains methanol, and the cell unit may be provided with a restraining membrane, on an anode-side surface of the electrolyte membrane other than that of the anode, which restrains methanol from permeating therethrough. This may prevent the so-called methanol crossover in which methanol travels from the anode side including the water reservoir directly to the cathode side even when the fuel is a liquid fuel containing methanol.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

The embodiments will now be described with reference to drawings. Note that in all of the Figures the same components are given the same reference numerals and the repeated description thereof is omitted as appropriate. The structures described hereinbelow are only exemplary and does not limit the scope of the present invention.

First Embodiment

Figure 1:
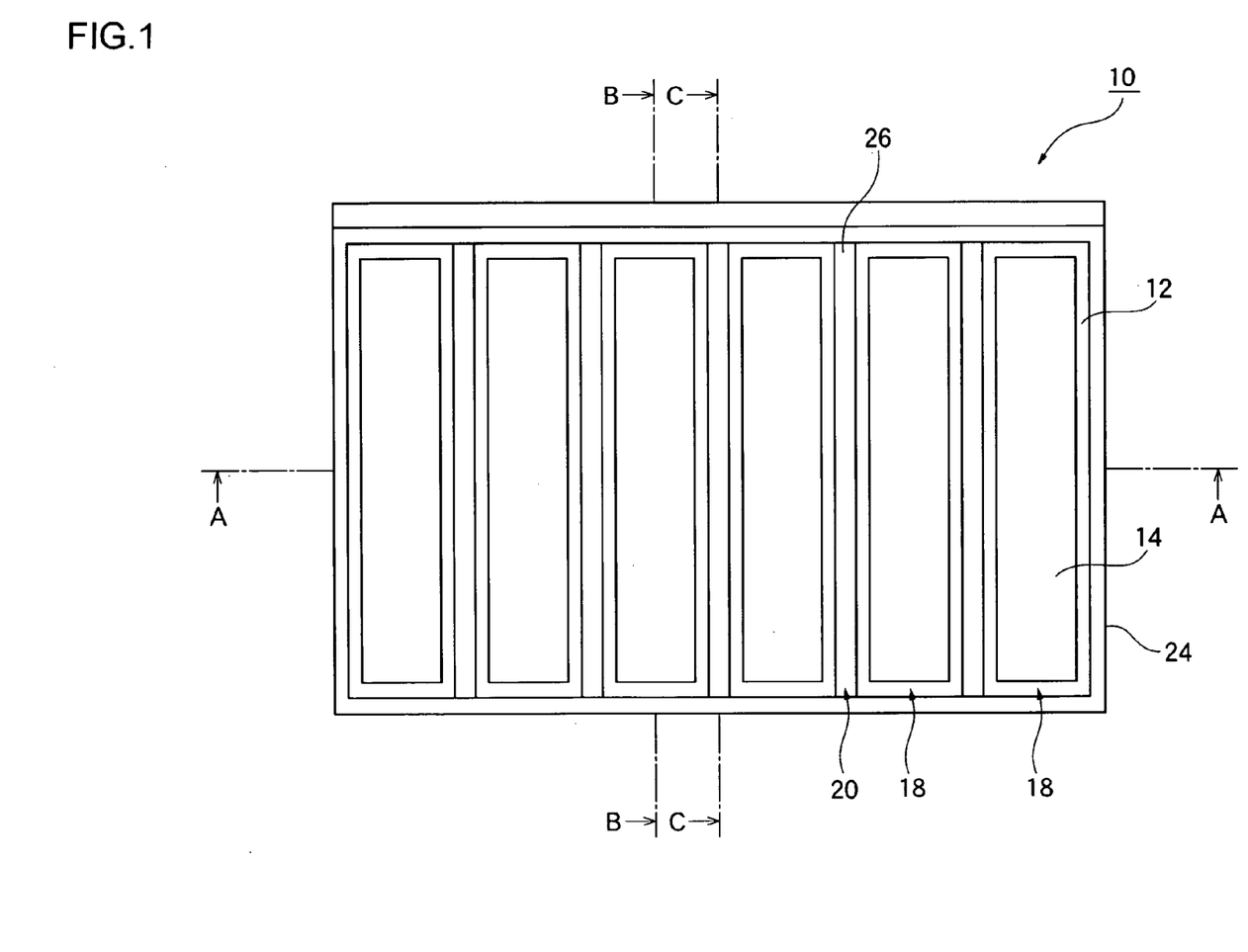
FIG. 1 is a schematic diagram showing a structure of a fuel cell module according to a first embodiment of the present invention.
Figure 2:
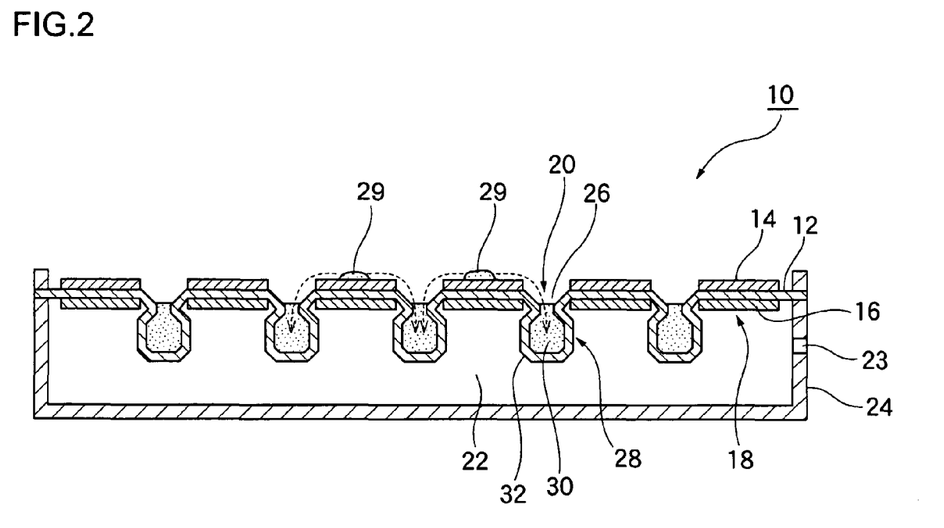
FIG. 2 is a cross-sectional view taken along a line A-A of a fuel cell module shown in FIG. 1.

FIG. 1 is a top view schematically illustrating a structure of a fuel cell module according to a first embodiment of the present invention. FIG. 2 is a cross-sectional view taken along the line A-A of the fuel cell module of FIG. 1.

As illustrated in FIG. 1 and FIG. 2, a fuel cell module 10 according to the first embodiment includes a plurality of cell units 18, each of which comprises a solid polymer electrolyte membrane 12, a cathode 14 disposed on one face of the electrolyte membrane 12, and an anode 16 disposed on the other face thereof, water reservoirs 20 for collecting water 29 produced at the cathodes 14, and a fuel chamber 22 disposed on the anode side for storing a fuel to be supplied to the anodes 16. Note that the cathodes 14 and the anodes 16 are each comprised of a catalyst layer, a gas diffusion layer, and a current collector (all not shown) which are integrally structured together.

The fuel chamber 22 is formed by the electrolyte membrane 12 of cell units 18 and an enclosure 24 enclosing a space on an anode side of the cell units 18. The enclosure 24 is provided with a fuel inlet 23 through which the fuel can be supplemented from outside the fuel chamber 22. The water reservoirs 20 each include an opening 26 formed in a region other than the cathode 14 of the cell unit 18 and a protruding part 28 projecting from the opening 26 to an anode side. It is to be noted that the fuel cell module 10 according to the present embodiment uses hydrogen as the fuel and the module is a dead-end type without a fuel exit (driven at 100% fuel utilization), but the module may also be a fuel-circulation type with a fuel exit.

When the fuel is hydrogen, an anodic reaction takes place at the anode 16 in which hydrogen molecules are decomposed into hydrogen ions and electrons as expressed in the following formula (1), whereas a cathodic reaction takes place at the cathode 14 in which water is produced through a reaction between oxygen contained in the air, hydrogen ions and electrons as expressed in the following formula (2).

$$H_2 \rightarrow 2H^+ + 2e^- \quad (1)$$

$$2H^+ + 2e^- + (\tfrac{1}{2})O_2 \rightarrow H_2O \quad (2)$$

Accordingly, as long as the fuel cell module 10 keeps generating power, water keeps being produced at the cathode 14. If the thus produced water 29 stays on the surface of the cathode 14, then it will become harder for air to arrive at the surface of the cathode 14, with the result that the cathodic reaction slows down and the output of the fuel cell module declines gradually.

In the case of the fuel cell module 10 according to the present embodiment, however, the water 29 produced at the cathode 14 is led along the dashed-line arrows to be collected in the water reservoirs 20 provided between cathodes 14, so that the water 29 produced at the cathode 14 can be removed from the surface thereof. As a result, it is now harder for the surface of the cathode 14 to be covered by the water 29 produced thereat, and thus impediment to the supply of air to the cathode 14 is prevented. Moreover, the water reservoir 20, which has a protruding part 28 projecting to the anode side, has a large volume for storage of the water 29 and is thus capable of storing much water 29.

The protruding part 28 projecting to the anode side is located inside the fuel chamber 22. But because the fuel, such as hydrogen, in the fuel chamber 22 has a higher diffusivity than air, the protruding part 28 has less effect on the supply of the fuel to the anode 16 than where the water reservoir 20 is so provided as to project to the cathode side. As a result, the fuel cell module 10 can keep generating stable output over a long period of time.

The fuel cell module 10 according to the present embodiment has a plurality of cell units 18 which includes at least a first cell unit comprising a first anode and first cathode, and a second cell unit comprising a second anode and a second cathode, arranged practically in a plane, and therefore openings 26 of the water reservoirs 20 may be formed between the cathodes of the cell units 18. In the case of a fuel cell module capable of providing a large electromotive force by a plurality of cell units 18 arranged with space between each other and connected in series by wiring, for instance, the openings 26 of water reservoirs 20 provided in the spaces between the cathodes of the cell units 18 allow efficient collection of water 29 produced at the cathodes while restricting the size of the fuel cell module 10 as a whole.

Figure 3:
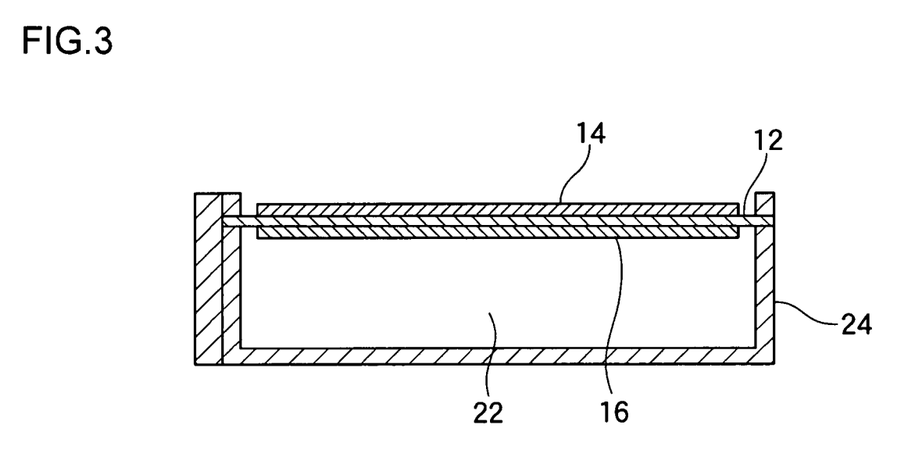
FIG. 3 is a cross-sectional view taken along a line B-B of a fuel cell module shown in FIG. 1.
Figure 4:
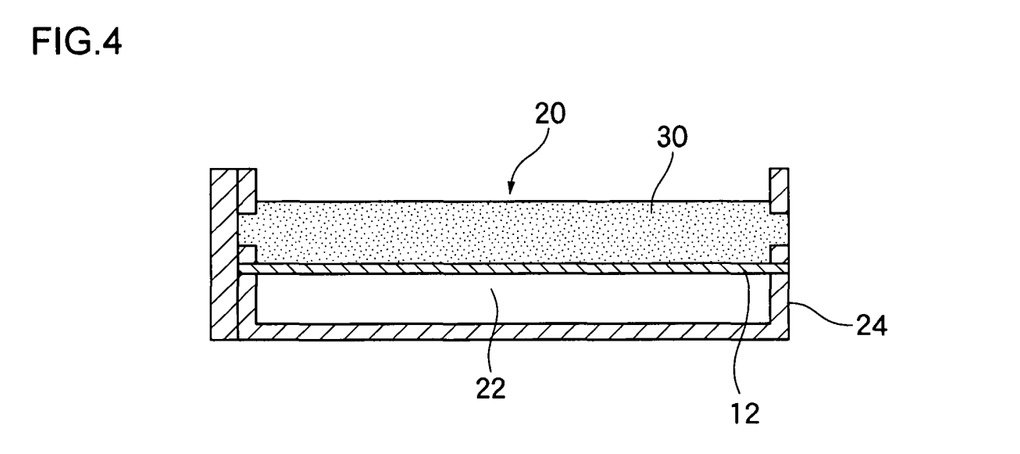
FIG. 4 is a cross-sectional view taken along a line C-C of a fuel cell module shown in FIG. 1.

Now a detailed description will be given of the water reservoir 20 according to the first embodiment of the present invention. The water reservoir 20 includes a water-absorbing member 30 that can absorb water 29 into the protruding part 28 thereof. FIG. 3 is a cross-sectional view taken along the line B-B of the fuel cell module 10 shown in FIG. 1. FIG. 4 is a cross-sectional view taken along the line C-C of the fuel cell module 10 shown in FIG. 1.

As shown in FIG. 2 or FIG. 3, above the region where the cathode 14 is disposed is no water reservoir part that may interfere with the diffusion of air. In other words, a cathode-side surface of the cell unit 18 is a flat surface without any protrusion that can interfere with the diffusion of air. Consequently, on account of a uniform supply of air to the cathode 14, the fuel cell module 10 can generate stable output even when it is applied to a passive-type fuel cell system.

On the other hand, as shown in FIG. 4, below a gap between cathodes is an approximately cylindrical water reservoir 20 provided in parallel with the longitudinal direction of the cathode 14 in such a manner as to project to the anode side. The water reservoir 20 has the internal space of the protruding part 28 filled with a water-absorbing member 30. Accordingly, it is possible to prevent the water once collected in the water reservoir 20 from flowing back to the cathode 14. The water-absorbing member 30 can have the water evaporate gradually, thereby discharging it outside the fuel cell module 10 without allowing it to condensate on the cathode surface. Further, the water-absorbing member 30 can humidify the fuel by having the water evaporate gradually into the fuel chamber 22. Note also that a structure may also be provided by which the water having been collected in the water reservoir 20 is led out of the fuel cell module and stored temporarily. Also, a structure so configured as to have the water evaporate easily, for instance, a water-absorbing member with wider surface area, may be provided separately.

As with the fuel cell module 10 according to the first embodiment, the volume of water that can be collected can be increased by providing water reservoirs 20 extending in one direction between the opposing side walls of the enclosure 24. Discussed below is an example illustrating how much water produced at the cathodes during power generation can be collected by such a system.

Figure 5:
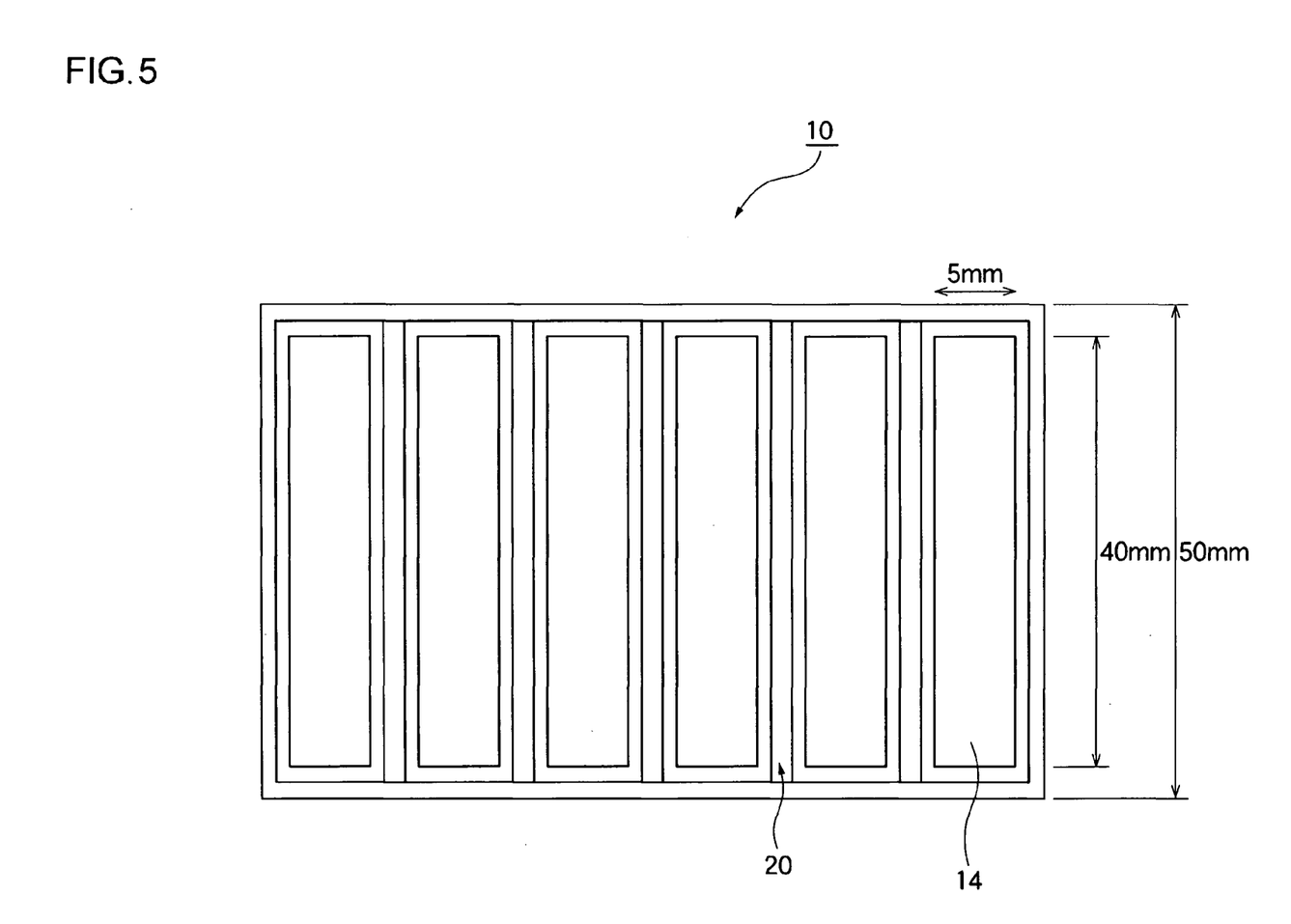
FIG. 5 is a top view for explaining the sizes of cathodes and water reservoirs of a fuel cell module.
Figure 6:
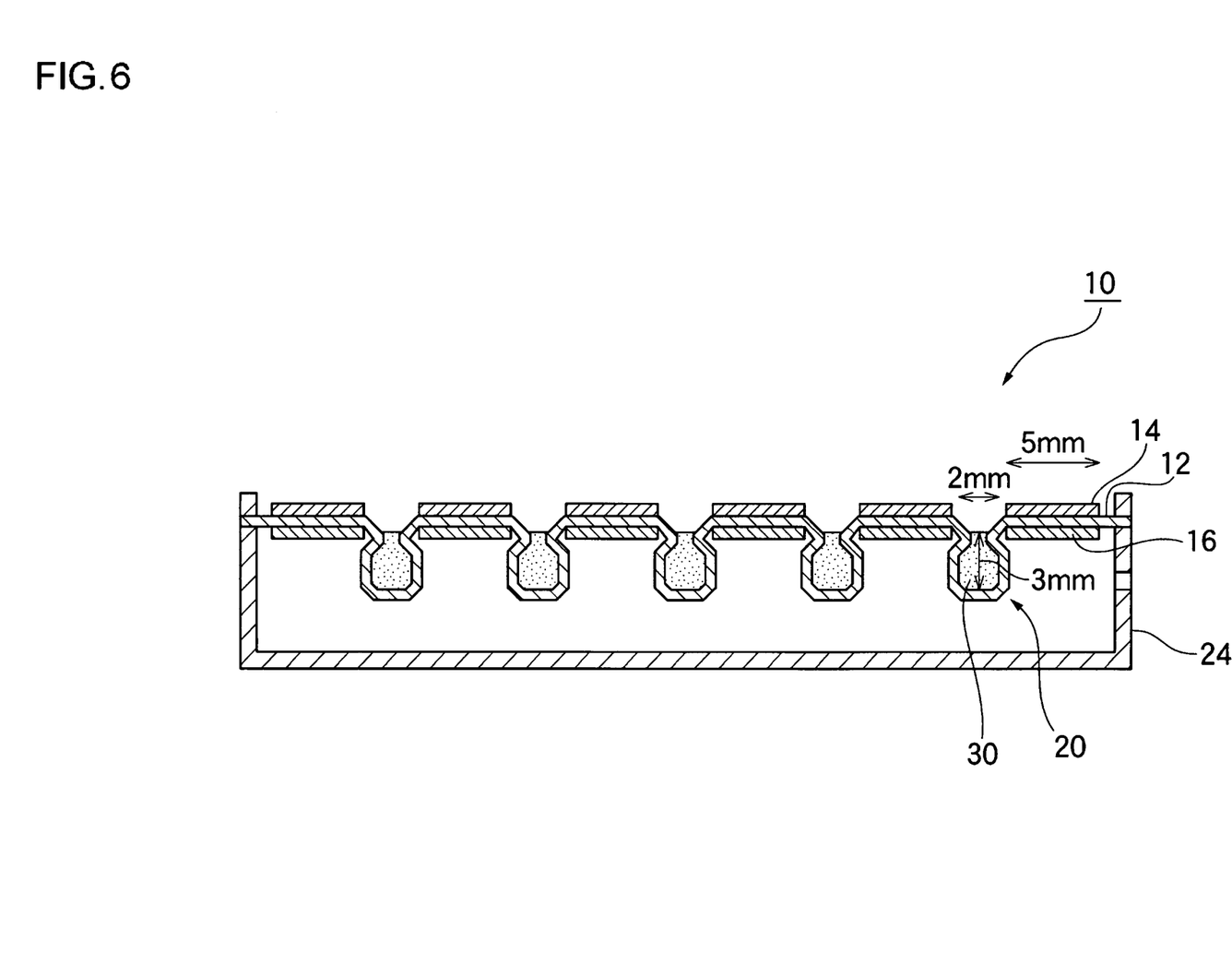
FIG. 6 is a top cross-sectional view for explaining the sizes of cathodes and water reservoirs of a fuel cell module.

FIG. 5 is a top view for explaining the sizes of cathodes and water reservoirs 20 of a fuel cell module. FIG. 6 is a top cross-sectional view for explaining the sizes of cathodes and water reservoirs 20 of the fuel cell module.

For example, where the fuel is hydrogen and the cell unit employed performs at an output density of 0.1 W/cm² and a cell voltage efficiency of 50% (cell voltage of 0.74 V), water may be produced at the cathode at a rate of 45 mg (0.045 cc) per hour for an electrode area of 1 cm². If cell units like this are used for the fuel cell module 10 as shown in FIG. 5, the total area S of the cathodes 14 in six positions will be:

$S = 40 \text{ [mm]} \times 5 \text{ [mm]} \times 6 = 1200 \text{ [mm}^2\text{]} = 12 \text{ [cm}^2\text{]}$ Accordingly, the amount $W_1$ of water produced by one hour of power generation by the fuel cell module 10 will be:

$W_1 = 45 \text{ [mg/(h·cm}^2\text{)]} \times 12 \text{ [cm}^2\text{]} = 540 \text{ [mg/h]}$ On the other hand, the volume V of the water reservoirs 20 in five positions will be:

$V = 2 \text{ [mm]} \times 3 \text{ [mm]} \times 50 \text{ [mm]} \times 5 = 1500 \text{ [mm}^3\text{]}$ The water-absorbing member 30 is preferably a porous material with a hydrophilic property. The water-absorbing member 30 may be selected from a variety of porous materials, such as felt, sponge, sintered resin particle material, sintered resin fiber material, natural fiber, and bundled resin fiber material. For example, when the porosity of such material is 90%, the amount $W_{max}$ of water that can be retained by the water-absorbing member 30 will be:

$W_{max} = 1500 \text{ [mm}^3\text{]} \times 0.9 \times 1 \text{ [mg/mm}^3\text{]} = 1350 \text{ [mg]}$ Accordingly, the continuous operation time T of the fuel cell module 10 until the water reservoirs 20 are filled completely with the water produced at the cathodes will be:

$T = W_{max}/W_1 = 1350 \text{ [mg]}/540 \text{ [mg/h]} = 2.5 \text{ [h]}$

Therefore, even under severe conditions where absolutely no water evaporates from the water reservoirs 20 during a continuous power generation by the fuel cell module 10, the present system can reduce water capable of covering the surface of the cathodes for at least 2.5 hours from the start of power generation.

The electrolyte membrane 12 according to the first embodiment of the present invention includes a recessed part (i.e., a concavity) 32 hollowed to the anode side in such a manner as to form a protruding part 28 in the region where the water reservoir 20 is disposed. In other words, the protruding part 28 is formed by part of the electrolyte membrane 12 projecting to the anode side. The construction like this allows the water reservoir 20 to protrude to the anode side without making a hole in the electrolyte membrane 12. And this simple structure helps maintain the airtightness of the cell unit 18, particularly that on the anode side thereof better than where the water reservoir is so provided as to penetrate the electrolyte membrane. In this configuration, the outer shape of the protruding part 28 of the water reservoir 20 is maintained by the water-absorbing member 30. Note also that the electrolyte membrane 12 having the recessed part 32, namely, the electrolyte membrane 12 having a part thereof projecting to the anode side, may be produced by a casting method, for instance.

Second Embodiment

Figure 10:
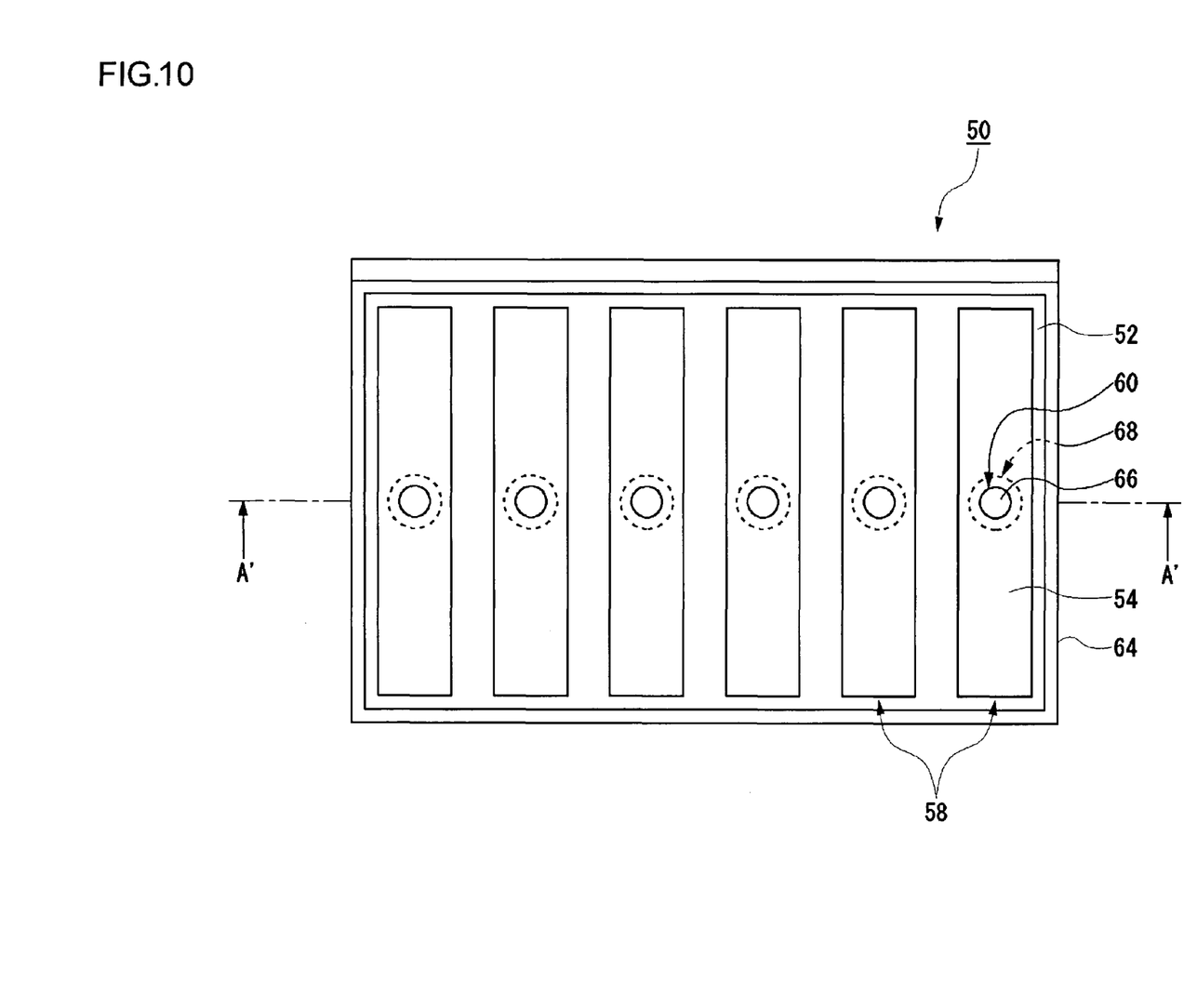
FIG. 10 is a top view schematically illustrating a structure of a fuel cell module according to a second embodiment of the present invention.
Figure 11:
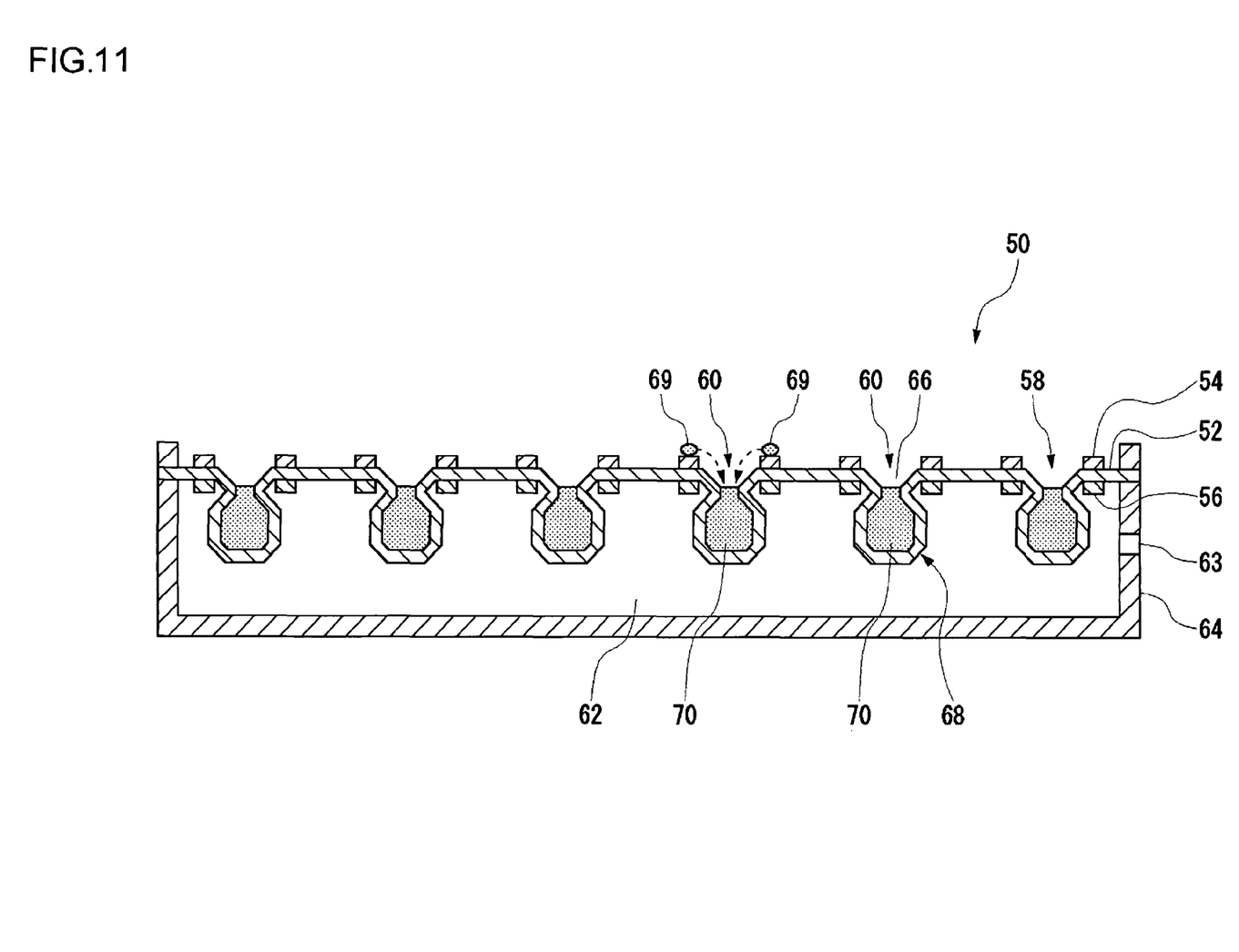
FIG. 11 is a cross-sectional view taken along a line A'-A' of a fuel cell module shown in FIG. 10.

A fuel cell module according to a second embodiment of the present invention differs from the fuel cell module 10 of the first embodiment in that the opening of a water reservoir is formed in the cathode of a cell unit. FIG. 10 is a top view schematically illustrating a structure of a fuel cell module according to the second embodiment. FIG. 11 is a cross-sectional view taken along the line A'-A' of the fuel cell module of FIG. 10.

As illustrated in FIG. 10 and FIG. 11, a fuel cell module 50 according to this second embodiment includes a plurality of cell units 58, each of which comprises a solid polymer electrolyte membrane 52, a cathode 54 disposed on one face of the electrolyte membrane 52 and an anode 56 disposed on the other face thereof, water reservoirs 60 for collecting water 69 produced at the cathodes 54, and a fuel chamber 62 disposed on the anode side for storing a fuel to be supplied to the anodes 56. Note that the cathodes 54 and the anodes 56 are each comprised of a catalyst layer, a gas diffusion layer, and a current collector (all not shown) which are integrally structured together.

The fuel chamber 62 is formed by the electrolyte membrane 52 of cell units 58 and an enclosure 64 enclosing a space on the anode side of the cell units 58. The enclosure 64 is provided with a fuel inlet 63 through which the fuel can be supplemented from outside the fuel chamber 62. The water reservoirs 60 each include a circular opening 66 formed in the cathode 54 of the cell unit 58 and a protruding part 68 projecting from the opening 66 to the anode side. Also, the water reservoirs 60 each has a water-absorbing member 70 for absorbing water 69 into the protruding part 68 thereof.

In the case of the fuel cell module 50 according to the second embodiment, the water 69 produced at the cathode 54 is led along the dashed-line arrows to be collected in the water reservoir 60, so that the water 69 produced at the cathode 14 can be removed from the surface thereof. As a result, it is now harder for the surface of the cathode 54 to be covered by the water 69 produced thereat, and thus there is much less impediment to the supply of air to the cathode 54. Moreover, the water reservoir 60, which has a protruding part 68 projecting to the anode side, has a large volume for storage of the water 69 and is thus capable of storing much water 69. It is to be noted that the shape of the protruding part 68 may be circular as illustrated in FIG. 10 or may also be prismatic or cylindrical as in the first embodiment.

With the fuel cell module 10 according to the second embodiment of the present invention, the water 69 produced at the cathode 54 can be collected in the water reservoir 60 provided in the cathode 54, so that the water 69 can be removed efficiently from the surface of the cathode 54. This makes it hard for the cathode 54 to be covered by the water 69 it has produced, and there is thus little impediment to the supply of the oxidant, such as air, to the cathode 54. As a result, the fuel cell module 10 can achieve a stable output over a long period of time.

Third Embodiment

Figure 7:
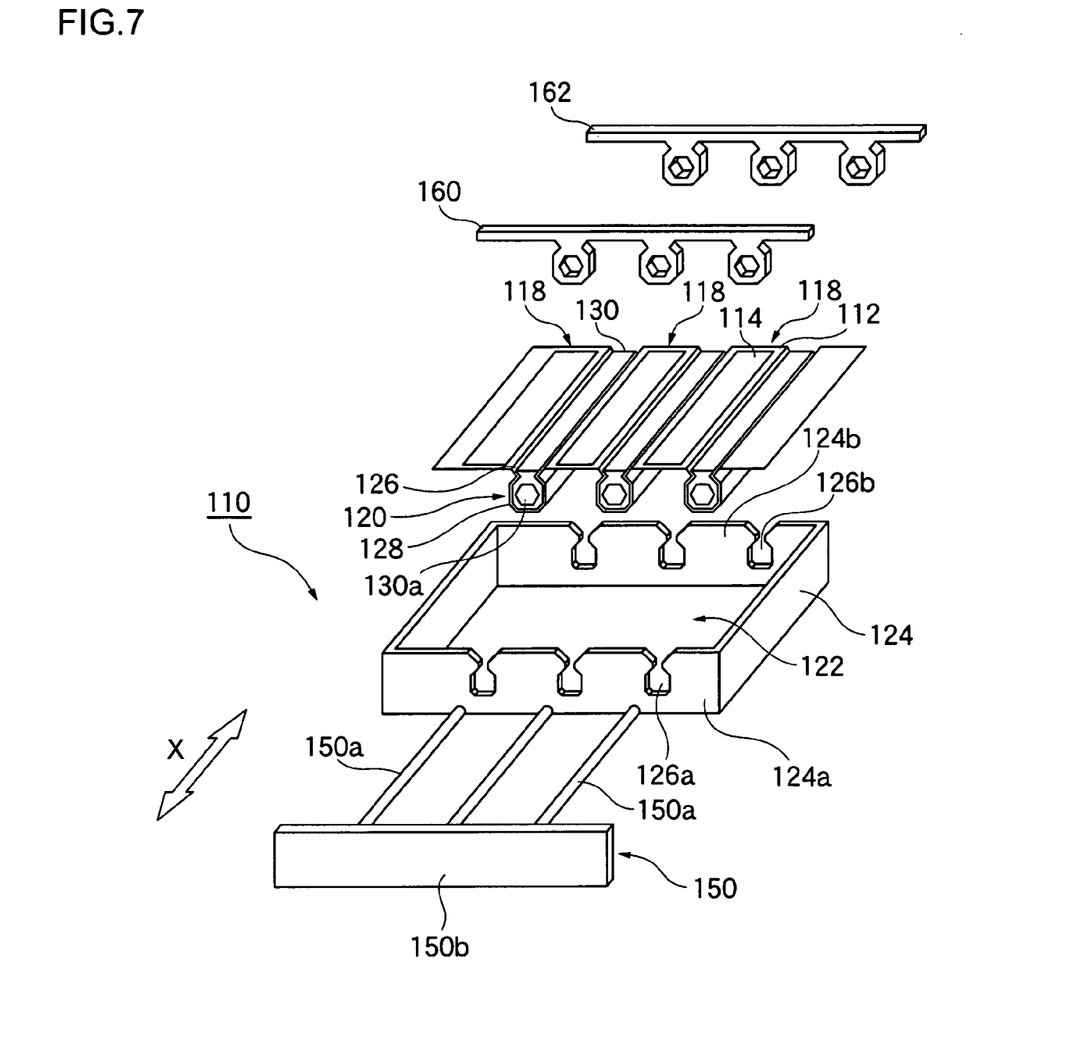
FIG. 7 is an exploded perspective view of a fuel cell module according to a third embodiment of the present invention.

When power generation by a fuel cell module lasts a long time, there may be cases where water is produced at the cathodes in excess of the water retention capacity of the water-absorbing member thereof. To solve this problem, a fuel cell module 110 according to a third embodiment of the present invention is so configured that at least one part of the water-absorbing member is detachable from the water reservoir.

FIG. 7 is an exploded perspective view of a fuel cell module according to the third embodiment. The fuel cell module 110 includes a plurality of cell units 118, each of which comprises a solid polymer electrolyte membrane 112, a cathode 114 disposed on one face of the electrolyte membrane 112, and an anode (not shown) disposed on the other face thereof, water reservoirs 120 for collecting water produced at the cathodes 114, and a fuel chamber 122 disposed on an anode side for storing a fuel to be supplied to the anodes.

The water reservoir 120 includes an opening 126 formed in a region of the cell unit 118 other than the cathode 114, a protruding part 128 projecting from the opening 126 to the anode side, and a water-absorbing member 130 for absorbing water into the protruding part 128. The fuel chamber 122 is formed by the electrolyte membrane 112 of cell units 118 and an enclosure 124 enclosing a space on the anode side of the cell units 118. The enclosure 124 is of such design that the sides 124a and 124b thereof have through openings 126a and 126b, respectively, for the installation of a cartridge member 150 to be described later in the same number as that of the water reservoirs 120.

And the fuel chamber 122 is sealed by placing in alignment the outer periphery of the electrolyte membrane 112 combined with a plurality of cell units 118 on the top surface of the enclosure 124 and fitting sealing members 160 and 162 into the through openings 126a and 126b, respectively. It should be noted that the water reservoirs 120, which extend in the same direction between the opposing sides 124a and 124b of the enclosure 124, have an ample capacity to retain water. Note also that the water-absorbing member 130 is a cylindrical member having a hollow portion 130a running therewithin.

The cartridge member 150 comprises a plurality of replacement absorbers 150a which are inserted into the hollow portions 130a of the water-absorbing members 130 in the respective water reservoirs 120 and a joining section 150b to which the ends of the plurality of replacement absorbers 150a are joined. And the cartridge member 150 is attached or detached in the arrow direction X as required to discharge water having been collected in the water reservoirs 120 outside.

Thus, the fuel cell module 110 allows replacement of the replacement absorbers 150a or reinstallation thereof after removal of water absorbed therein when water produced at the cathodes 114 has exceeded the ability of the water reservoirs 120 to retain the water as a result of a certain condition or time of power generation by the fuel cell module 110. As a result, the fuel cell module 110 can collect water produced afresh, thus contributing to a longer service of the product which uses the fuel cell module 110. It should also be noted that if the joining section 150b is made of the same material as the replacement absorbers 150a, then the cartridge member 150, as it is attached to the fuel cell module, will allow the evaporation of water through the joining section 150b. This will reduce the frequency of cartridge member replacement.

Fourth Embodiment

Figure 8:
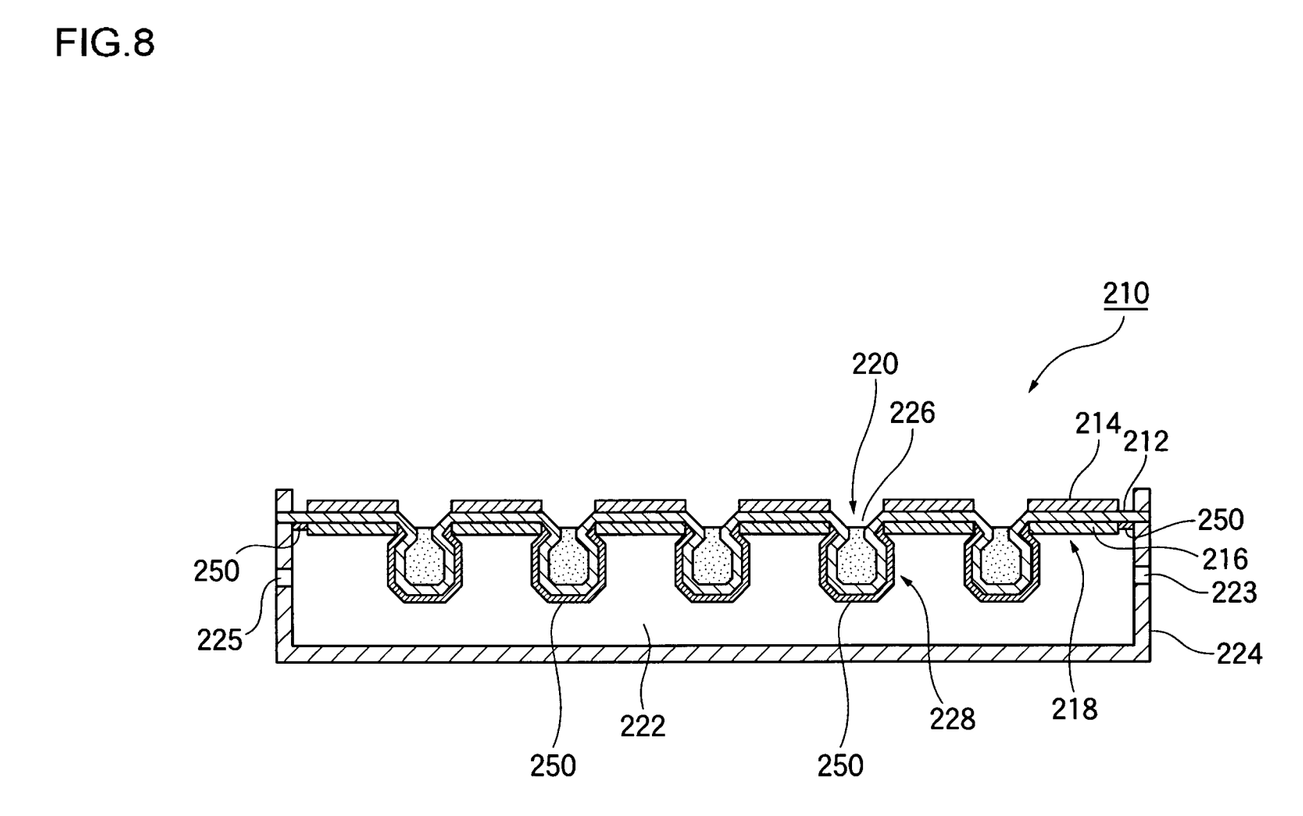
FIG. 8 is a cross-sectional view schematically illustrating a structure of a fuel cell module according to a fourth embodiment of the present invention.

FIG. 8 is a cross-sectional view schematically illustrating a structure of a fuel cell module according to a fourth embodiment of the present invention. A fuel cell module 210 according to the fourth embodiment differs distinctly from the fuel cell module 10 of the first embodiment in that it is provided with a methanol permeation preventive layer. Note that in the following description, the explanation of the same components as those of the fuel cell module 10 will be omitted as appropriate.

The fuel cell module 210 shown in FIG. 8 is a DMFC-type fuel cell module for which the fuel used is a methanol water solution or pure methanol (hereinafter referred to as "methanol fuel").

The fuel cell module 210 includes a plurality of cell units 218, each of which comprises a solid polymer electrolyte membrane 212, a cathode 214 disposed on one face of the electrolyte membrane 212, and an anode 216 disposed on the other face thereof, water reservoirs 220 for collecting water produced at the cathodes 214, and a fuel chamber 222 disposed on the anode side for storing a methanol fuel to be supplied to the anodes 216.

The fuel chamber 222 is formed by the electrolyte membrane 212 of cell units 218 and an enclosure 224 enclosing a space on the anode side of the cell units 218. The enclosure 224 is provided with a fuel inlet 223 through which the fuel can be supplemented from outside the fuel chamber 222 and a gas outlet 225 through which carbon dioxide produced at the anodes 216 during power generation is discharged. The gas outlet 225 is provided with a gas-liquid separation filter, for instance. The water reservoirs 220 each include an opening 226 formed in the region of the cell unit 218 other than the cathode 214 and a protruding part 228 projecting from the opening 226 to the anode side.

The cell units 218 are provided with restraining membranes 250 on the anode-side surface of the electrolyte membrane 212 other than that of the anodes 216, which restrain methanol from permeating therethrough. This may prevent the so-called methanol crossover in which methanol travels from the anode side including the water reservoir 220 directly to the cathode side even when the fuel is a liquid fuel containing methanol.

For example, the restraining membrane 250 is preferably a hydrocarbon polymer membrane, such as a polystyrene sulfonate, having a sulfonate group, or a polymer membrane, such as a polyindole membrane or a polyaniline membrane, having an NH group. Other examples of polymer membrane having an NH group may be polyaniline and polybenzimidazole, which can be doped with an acid if necessary. Further, inorganic compounds having a proton conductivity may also be used. For example, amorphous compounds containing $P_2O_5$ or glass-forming oxides, such as $SiO_2$ or $B_2O_3$, may be preferable materials for the restraining membrane.

Fifth Embodiment

Figure 9:
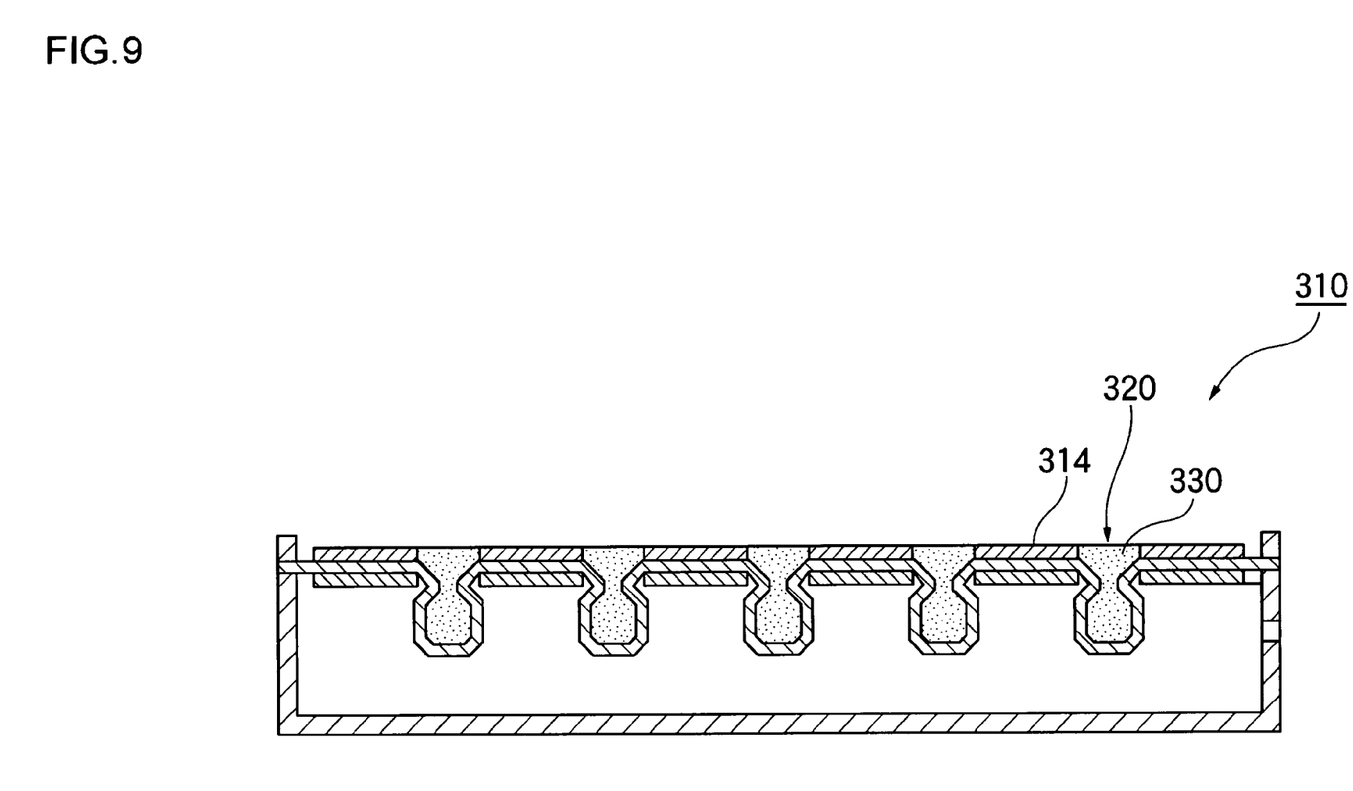
FIG. 9 is a cross-sectional view schematically illustrating a structure of a fuel cell module according to a fifth embodiment of the present invention.

FIG. 9 is a cross-sectional view schematically illustrating a structure of a fuel cell module according to a fifth embodiment of the present invention. The fuel cell module 310 according to the fifth embodiment is characterized by the feature that an upper part of the water-absorbing member 330 is in contact with a side of the cathode 314. This arrangement allows the water produced at the cathode 314 to be easily led to the water reservoir 320.

The present invention has been described by referring to each of the above-described embodiments. However, the present invention is not limited to the above-described embodiments only, and those resulting from any combination of them or substitution as appropriate are also within the scope of the present invention. Also, it is understood that various modifications such as changes in design may be made in a fuel cell module or cell units, based on the knowledge of those skilled in the art, and the embodiments added with such modifications are also within the scope of the present invention.

In the foregoing embodiments, the water reservoirs 20 are formed using part of the electrolyte membrane 12, but they can be formed by a member other than the electrolyte membrane.

What is claimed is:

1. A fuel cell module, comprising:
 a cell unit including an electrolyte membrane, a cathode disposed on one face of the electrolyte membrane, and an anode disposed on another face of the electrolyte membrane;
 a fuel chamber provided on the other face of the electrolyte membrane to contain the anode, the fuel chamber being configured to collect a fuel to be supplied to the anode;
 a water reservoir provided adjacent to the cell unit, the water reservoir being a part of the fuel chamber to enclose a space in which the fuel is collected, wherein
 said water reservoir comprises a protruding part protruding into the space of the fuel chamber,
 the protruding part has an internal space for storing water from the cathode, and
 the protruding part is formed of the electrolyte membrane.

2. A fuel cell module according to claim 1, wherein the protruding part is formed of a part of the electrolyte membrane on which the anode and the cathode are provided.

3. A fuel cell module according to claim 1, wherein the protruding part is formed of a material which is the same as the electrolyte membrane of the cell unit.

4. A fuel cell module according to claim 1, wherein said water reservoir includes a water-absorbing member that absorbs the water inside the protruding part.

5. A fuel cell module according to claim 4, wherein the water-absorbing member is so constructed that at least one part thereof is detachable from said water reservoir.

6. A fuel cell module according to claim 1, wherein the water reservoir has an opening adjacent to the cathode of the cell unit,
 a plurality of cell units including the cell unit are arranged in a plane, and
 wherein the opening of said water reservoir are formed between the cathodes of the cell units.

7. A fuel cell module according to claim 6, wherein said water reservoir includes a water-absorbing member that absorbs the water inside the protruding part.

8. A fuel cell module according to claim 7, wherein the water-absorbing member is so constructed that at least one part thereof is detachable from said water reservoir.

9. A fuel cell module according to claim 1, wherein fuel used for the anode is a liquid fuel which at least contains methanol, and
 wherein said cell unit is provided with a restraining membrane, on the anode-side surface of the electrolyte membrane other than that of the anode, which restrains methanol from permeating therethrough.

10. A fuel cell module comprising:
 a first cell unit comprising an electrolyte membrane, a first cathode provided on a first surface of the electrolyte membrane, and a first anode provided on a second surface of the electrolyte membrane;
 a second cell unit comprising the electrolyte membrane, a second cathode provided on the first surface of the electrolyte membrane, and a second anode provided on the second surface of the electrolyte membrane;
 a fuel chamber provided on the second surface of the electrolyte membrane for supplying a fuel to the anodes of the first and second cell units, wherein
 the electrolyte membrane between the cell units has a concavity for receiving water from the cathodes of the first and second cell units, a bottom of the concavity protruding into the fuel chamber.

* * * * *